United States Patent [19]
Gabl et al.

[11] Patent Number: 5,592,327
[45] Date of Patent: Jan. 7, 1997

[54] REGENERATIVE AMPLIFIER INCORPORATING A SPECTRAL FILTER WITHIN THE RESONANT CAVITY

[75] Inventors: Edward F. Gabl, Saline; David R. Walker; Yang Pang, both of Ann Arbor, all of Mich.

[73] Assignee: Clark-MXR, Inc., Dexter, Mich.

[21] Appl. No.: 581,045

[22] Filed: Dec. 29, 1995

Related U.S. Application Data

[63] Continuation-in-part of Ser. No. 358,023, Dec. 16, 1994, abandoned.

[51] Int. Cl.$^6$ ................................. H01S 3/00; H01S 3/08
[52] U.S. Cl. ................................. 359/348; 372/102
[58] Field of Search ............................ 359/347, 348, 359/337; 372/102

[56] References Cited

U.S. PATENT DOCUMENTS

| | | |
|---|---|---|
| 3,902,130 | 8/1975 | Pike . |
| 3,914,709 | 10/1975 | Pike et al. . |
| 3,934,210 | 1/1976 | Yarborough et al. . |
| 4,156,852 | 5/1979 | Hagen . |
| 4,191,928 | 3/1980 | Emmett . |
| 4,243,942 | 1/1981 | Glass . |
| 5,175,736 | 12/1992 | Woodward et al. . |

Primary Examiner—Mark Hellner
Attorney, Agent, or Firm—Cumpston & Shaw

[57] ABSTRACT

A regenerative amplifier includes a resonant cavity having a gain medium and a spectral filter located in the cavity. A source is provided to pump the gain medium and thereby raise it to an excited state. Elements are also provided for creating laser seed pulses which are then injected into the resonant cavity, these elements preferably include in part a mode-locked oscillator having a wavelength substantially the same as that at which the gain medium can support amplification of the energy of the injected pulse. In a preferred embodiment the gain medium is Ti:Sapphire for both the amplifier and oscillator. Also, in the preferred embodiment the seed pulse from the oscillator is stretched in time by multiplicative factors sufficient to ensure that upon amplification, the seed pulse power density remains below the self-focusing threshold of the material through which the pulse is passed. The seed laser pulses are injected into the resonant cavity of the regenerative amplifier so as to provide multiple traversals of the resonant cavity and the gain medium therein, thereby amplifying the pulses. The pulse is recompressed back to some predetermined pulse width of interest to the user; for example, back to the temporal pulse width that is limited by the spectral bandwidth of the output pulse.

19 Claims, 1 Drawing Sheet

REGENERATIVE AMPLIFIER INCORPORATING A SPECTRAL FILTER WITHIN THE RESONANT CAVITY

CROSS REFERENCE TO RELATED APPLICATIONS:

This is a continuation-in-part of Ser. No. 08/358,023 filed Dec. 16 1994 abandoned.

FIELD OF THE INVENTION

The present invention relates to regenerative amplifier systems which amplify input pulses and provide amplified output pulses, and more specifically to regenerative amplifiers that incorporate a spectral filter element within the regenerative amplifier resonant cavity to prevent damage due to self-focusing and suppress gain narrowing effects.

BACKGROUND OF THE INVENTION

Regenerative amplifiers which have heretofore been proposed do not incorporate a spectral filter element within the cavity of the regenerative amplifier. Typically, systems lacking this feature are run at the peak of the gain profile, where the bandwidth of the seed laser dominates and thus swamps out self-oscillation within the resonant cavity of the amplifier itself. When the seed pulse is tuned to a wavelength that is substantially off the peak of the gain profile of the amplifying medium, there is no longer any mechanism to prevent a significant fraction of the energy available in the gain medium from being removed through the mechanism of self-oscillation in the amplifier resonant cavity. This is undesirable because, while the seed pulse may still be amplified to some degree, the output energy is degraded because of loss of energy through this parasitic process of self-oscillation. Additionally, since the off-peak amplified seed pulse is now incorporated within this self-oscillation emission, the temporal nature of the process being studied using these pulses becomes far more difficult to unravel. By incorporating a spectral filter element within the resonant cavity of the regenerative amplifier it is possible to suppress self-oscillation, and thus allow for greater amplification of only the seed pulse. This produces a cleaner, more useful output pulse. It also produces a pulse with the desirable feature that it has a time-bandwidth product (TBWP) that is nearly transform-limited.

When a regenerative amplifier is run in a mode that is optimized to amplify pulses of extremely short pulse duration, typically much less than 100 fs full width half maximum FWHM gain narrowing can limit the system's ability to maintain these extremely short pulse widths. By incorporating one or more suitably designed and oriented spectral filters within the regenerative amplifier cavity, it is possible to shape the system's effective gain profile to preserve the pulse width of the seed pulse throughout the amplification process. Another advantage to the use of a suitably designed and oriented spectral filter or filters in a regenerative amplifier cavity is it can act as a passive protection mechanism that prevents catastrophic damage due to self-focusing.

Initial attempts to run regenerative amplifier systems designed to amplify seed pulses of femtosecond (fs) or near femtosecond duration (that is, pulses of full width half maximum [FWHM] duration ranging from 1 to several hundred fs) so as to produce longer pulses of several hundred femtosecond and even picosecond (ps) duration (that is pulses of duration FWHM ranging from 0.1 ps to 1000 ps), which are also transform-limited, have used a bandwidth-limiting element within the stretcher or compressor portion of the system itself, and not within the resonant cavity of the regenerative amplifier. Heretofore it had been believed that limiting the bandwidth in the resonant cavity of the regenerative amplifier should be avoided because doing so would create pulses of such short duration that they would be amplified to pulse energies that exceed the self-focusing threshold in the amplifier. Regenerative amplifiers operate on the principle of chirped pulse amplification wherein the injected pulse has a pulse width whose duration is stretched out in time before being injected into the amplifier resonant cavity. In this manner the self-focusing threshold, which, when exceeded can result in catastrophic damage to components therein, is avoided upon amplification. However, the chirp created on the injected pulse by the stretcher is typically arranged so that the variation in frequency is mostly linear over the duration of the pulse. Consequently, limiting the bandwidth in the amplifier resonant cavity would also result in a reduction of the pulse width of the injected pulse within the amplifier itself, and thereby place the amplifier components at risk of damage due to self-focusing.

The elements used to limit the seed pulse bandwidth within either the stretcher or compressor, or both, usually take the form of a slit which is used to aperture the beam, and consequently the spectrum, at a position where the spectrum of the seed pulse is horizontally dispersed. The strategic placement of this slit within the stretcher or compressor, and the appropriate adjustment of its width, limits the bandwidth of the pulse seeded into the regenerative amplifier, and consequently the bandwidth of the output pulse. This creates a pulse of longer temporal duration. However, a slit placed in the stretcher does not guarantee that the output pulse from the system will be substantially transform-limited, because when the system is run off the peak of the gain curve, frequency pulling in the amplifier itself will shift the center wavelength of operation back toward the gain peak. Additionally, this approach has the disadvantage that the spectral profile of the seed pulse is now cut off in a manner that creates satellite pulses. Both of these are undesirable features.

A variant on the "slit within the stretcher" technique described above uses a "soft-edge" mask whose sides possess a slowly varying transmissivity or reflectivity as a function of position (depending on whether the mask is used in transmission or reflectivity to limit the spectral bandwidth of the pulse seeded into the regenerative amplifier). While this approach can ameliorate the problems associated with the creation of satellite pulses in the output of the regenerative amplifier, it still cannot compensate for frequency pulling effects that may result in spectrally broadened pulses when the system is run off the peak of the gain curve.

Using either a slit aperture or "soft-edge" aperture in the compressor avoids many of these problems, but this technique suffers from poor throughput, because the energy that is contained in the blocked frequencies is lost.

This invention is particularly suited for use in providing amplified pulses that are free of unwanted emissions at wavelengths other than those that are associated with the seed pulse. For example, this invention results in a significant reduction of unwanted self-oscillation emission at the peak of the gain from the resonant cavity of the regenerative amplifier when the seed pulse being amplified has a central wavelength that is substantially different from that corresponding to the peak of the gain of the amplifying medium. An additional advantage is that the presence of a spectral filter element whose parameters are judiciously chosen within the regenerative amplifier resonant cavity can produce a bandwidth-limiting effect that forces the regenerative amplifier to produce output pulses that are substantially longer in duration than has been possible before and have the desirable characteristic of being nearly transform-limited. Such pulses are useful in research applications where not only must the central wavelength be tunable to a specific transition wavelength of interest, but the spectral bandwidth must be limited in order to avoid pumping adjacent excited states. Moreover, when an amplifier according to this invention is seeded with pulses of broad spectral bandwidth as, for example, from an oscillator producing pulses of tens to hundreds of femtosecond duration, said judiciously chosen spectral filter element can function as a fine control over the central wavelength of oscillation of a long pulse amplifier. This allows a regenerative amplifier system's output to be tuned over a large fraction of the spectral emission band of the seed oscillator by adjustment of only the spectral filter element.

An additional advantage of incorporating a spectral filter element within the resonant cavity of a regenerative amplifier is that through the judicious choice of the parameters of the spectral filter element so as to limit the bandwidth of the pulse being amplified, it is possible to obtain transform-limited pulses of picosecond and near picosecond duration that are free of satellite pulses from a system capable of amplifying pulses of femtosecond duration. This feature significantly increases the number of scientific problems this invention can be used to address, and so the utility of the invention itself.

Yet another advantage of incorporating a spectral filter element within the resonant cavity of a regenerative amplifier is that it can serve as a passive protection mechanism that prevents catastrophic damage due to self focusing. The onset of self-focusing is accompanied by self-phase modulation and other nonlinear effects which broaden the spectral width of the pulse. The spectral limiting effects of a spectral filter in the regenerative amplifier cavity will block the further amplification of this excess bandwidth, thus effectively clamping the bandwidth at a level that prevents damage to the components of the system.

The aforementioned advantages of using a spectral filter in a regenerative amplifier cavity assumes that the filter is used in a configuration in which its transmission maxima affects the intended result. There are, however, conditions in which one may choose to run the spectral filter in a configuration in which its transmission minima is employed to produce the desired effect. For example, when amplifying extremely short seed pulses, it may be desirable to make use of the filter's transmission minima to alter the system's effective gain profile so as to reduce or minimize the effects of system gain narrowing on the output pulsewidth. Thus, if the regenerative amplifier were to possess an effective gain profile as a function of wavelength that was approximately gaussian in shape, the use of a spectral filter with a low finesse, approximately sinusoidal transmission function whose transmission minima was tuned to coincide with the peak of the gaussian gain profile would somewhat flatten the top of the gain curve and allow for the redistribution of energy into the spectral wings of the pulse being amplified. The effect would be to reduce gain narrowing in the amplification process and result in shorter pulse duration output pulses. Combinations of spectral filters operated in both transmission maxima, transmission minima, and detuned modes will result in pulse shapes that are desirable to affect many different output pulse shapes.

Accordingly, it is an object of the present invention to provide improved regenerative amplifier systems which are free of emission due to self-oscillation from the resonant cavity of the amplifier itself.

It is a further the object of the present invention to provide bandwidth-limited operation of regenerative amplifier systems that provide pulses with nearly transform-limited, time-bandwidth product performance within the entire tuning range of the gain medium.

It is a still further object of the present invention to provide improved regenerative amplifier systems with bandwidth-limited, nearly transform-limited, time-bandwidth product pulses of sub-picosecond and/or picosecond duration when seeded with pulses obtained from oscillators that are of femtosecond duration.

It is a still further object of the present invention to provide improved sensitivity and resolution in tuning the central wavelength of the output pulse from regenerative amplifier systems so that the central wavelength of the output pulse can be controlled with high precision.

It is a still further object of the present invention to provide improved regenerative amplifier systems with bandwidth-limited, nearly transform-limited, time-bandwidth product pulses of sub-picosecond and/or picosecond duration that are free of satellite pulses when seeded with pulses obtained from oscillators that are of femtosecond duration.

It is a still further object of the present invention to provide improved protection against catastrophic failure due to self-focusing in regenerative amplifier systems.

It is a still further object of the present invention to provide improved amplification of extremely short seed pulses by altering the effective gain profile as a function of wavelength of a regenerative amplifier.

BRIEF DESCRIPTION OF THE INVENTION

Briefly described, regenerative amplifier apparatus embodying the invention utilizes a resonant cavity having a gain medium and a spectral filter element located in the cavity. A source is provided to pump the gain medium and thereby raise it to an excited state. Elements are also provided for creating laser seed pulses which are then injected into the resonant cavity, these elements preferably include in part a mode-locked oscillator having a wavelength substantially the same as that at which the gain medium can support amplification of the energy of the injected pulse. In a preferred embodiment of the invention, the gain medium is Ti:Sapphire for both the amplifier and oscillator. Also, in the preferred embodiment means are provided to stretch the seed pulse from the oscillator in time by multiplicative factors sufficient to ensure that upon amplification, the seed pulse power density remains below the self-focusing threshold of the material through which the pulse is passed. Means are also provided for injecting the seed laser pulses into the resonant cavity of the regenerative amplifier so as to provide multiple traversals of the resonant cavity and the gain medium therein, thereby amplifying the pulses. Additionally means may be provided to recompress the pulse back to some predetermined pulse width of interest to the user: for example, back to the temporal pulse width that is limited by the spectral bandwidth of the output pulse.

BRIEF DESCRIPTION OF THE DRAWINGS

The foregoing and other objects, features and advantages of the invention, as well as presently preferred embodiments thereof, will become more apparent from a reading of the following description in connection with the accompanying drawings in which.

DETAILED DESCRIPTION OF THE INVENTION

Figure 1:
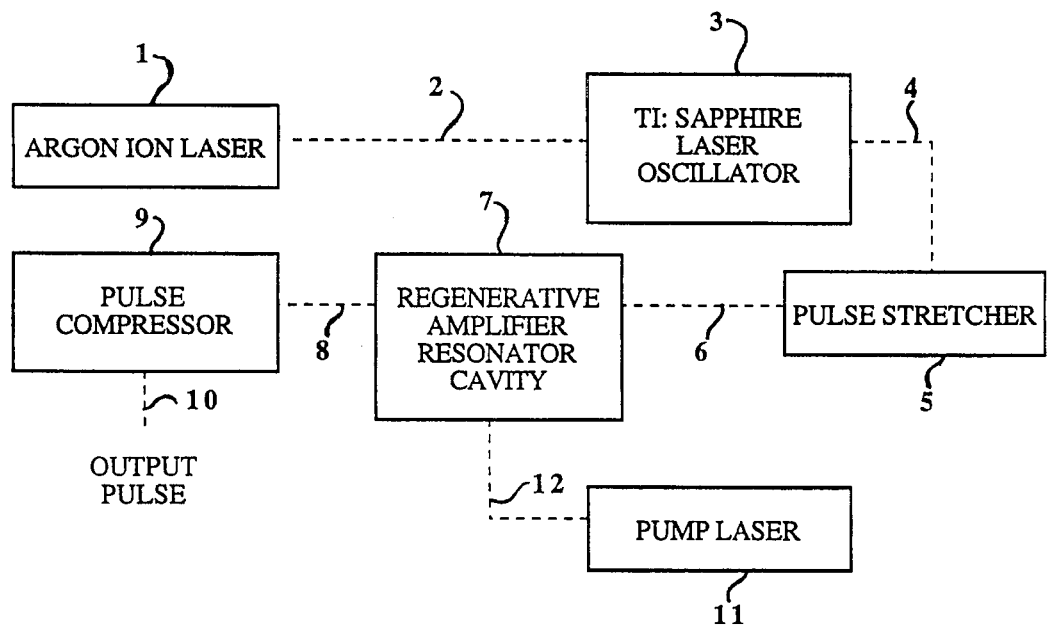
FIG. 1 is a schematic diagram illustrating a regenerative amplifier system in accordance with a preferred embodiment of the invention.

Referring first to FIG. 1 there is shown a source 1, used to pump a mode-locked laser. In this illustration, the pump source is a CW argon ion laser, 1, whose output laser beam, 2, pumps a self-mode-locked Ti:Sapphire laser oscillator, 3, producing ultrashort pulses of femtosecond or picosecond duration. Other sources of ultrashort pulses are diode pump solid-state lasers, for example, a diode laser-pumped Li:SAF laser, both CW and pulse lamp-pumped media such as alexandrite, a diode-laser pumped Er-doped fiber laser run either in the fundamental or the harmonic generated through a suitable parametric process, synchronously pumped systems such as a mode-locked, frequency-doubled Nd:YLF laser synchronously pumping a dye laser, and so forth. There are numerous additional examples of oscillators both CW and pulsed that would satisfy the essential requirement that they produce pulses of picosecond or femtosecond duration at a wavelength that overlaps at least to some degree the gain bandwidth in the regenerative amplifier itself. The output pulses, 4, of this mode-locked laser are directed into a pulse stretcher, 5, where they are stretched in time to a duration sufficient to avoid being amplified to an energy density that exceeds the self-focusing threshold of the amplifier itself. Numerous stretcher designs known to those skilled in the art may be used in this invention. Typical examples include fibers and grating stretchers of the type described in the literature, or even stretching via group velocity dispersion by multiple passes in the gain medium itself. (In some regenerative amplifier designs, the use of a pulse stretcher that is separate from the amplifier may not be required to avoid self-focusing. Rather, a sufficient number of passes through the amplifier gain medium itself may be enough to broaden the pulse sufficiently as a result of group velocity dispersion in the material through which the pulse passes.) The mention of a specific design here is meant to be illustrative and not limiting on the scope of this disclosure. By stretching the pulse out temporally, it is possible to avoid damage to the components in the system.

Under some conditions it is possible that the spectral filter incorporated in the amplifier resonator will prevent the aforementioned damage. For example, using a birefringent filter type of spectral filter in the amplifier cavity having a filter bandpass that is comparable to or less than the requisite bandwidth of the amplifier output and operating the filter in the transmission maxima regime, prevents damage to the amplifier at energy levels at which damage previously occurred. The amount of energy that this system can produce saturates at a maximum output power, irrespective of how much additional pump power is added to the system. This is consistent with our belief that the excess pulse energy created by increasing the pump energy beyond a saturation level is going into additional bandwidth that is being blocked by the spectral filter inside the regenerative amplifier cavity because it lies outside its transmission band. This invention protects the amplifier system from catastrophic damage due to self-focusing precisely because it bleeds away this excess energy associated with the highly nonlinear effects that are the precursors of self-focusing in a regenerative amplifier.

The stretched pulse, 6, is the input pulse to the regenerative amplifier, 7, which is pumped by the output 12, of pump laser 11, and is amplified therein to produce highly energetic pulses of many picoseconds duration. (Those skilled in the art will immediately recognize other ways to create an excited gain medium. For example pumping with laser diodes, CW or pulsed lamps, light emitting diodes, arc lamps, the sun, and other coherent and incoherent sources that emit wavelengths in the absorption spectrum of the gain medium, either directly or through some process of nonlinear conversion. Once again, the mention of a specific pump laser or pumping configuration is not meant to limit the scope of this invention, but rather to illustrate the concept. What is essential is that a mechanism be provided that raises the gain medium in the regenerative amplifier to an excited state so that the injected pulse can be amplified in it.) These amplified pulses, 8, are then compressed in the compressor, 9, back to nearly their original value to form the amplified output pulse, 10. The details of each component assembly of this system are known to those skilled in the art, with the exception of the detail to follow, and so do not require elaboration.

Figure 2:
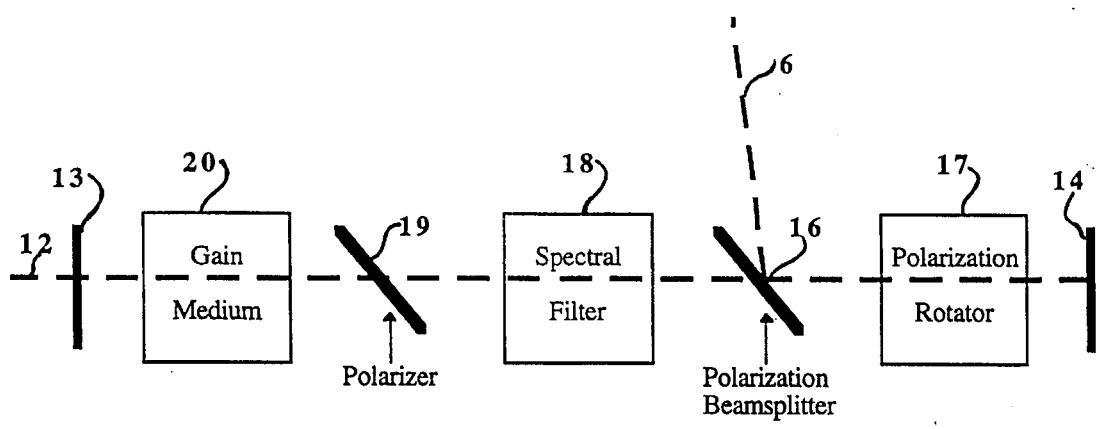
FIG. 2 is a schematic diagram illustrating the resonant cavity portion of a regenerative amplifier system shown in FIG. 1.

In FIG. 2 there is shown a more detailed diagram of the resonant cavity of the regenerative amplifier. This particular configuration is but one of many variations on designs that can be made to amplify seed pulses. The resonant cavity is formed by mirrors 13, and 14, which are made to be high reflectors at the operating wavelength of the seed laser pulse. Mirror 13, is also made to be highly transmissive at the wavelength of the pump laser 11, whose output 12, is caused to be incident on the gain medium 20, wherein it is absorbed, and thereby raises it to an excited state. As stated earlier, the particular means by which the gain medium is pumped is not critical to this invention. All that is required is that the gain medium be excited so that a pulse traversing through the material will be amplified. Within the resonant cavity there is a device for rotating the plane of polarization of the beam, 17, a polarization element whose reflectivity is determined by the polarization of the beam incident on it, 16, the spectral filter element, 18, another polarizing element 19, which may be, for example, Brewster windows on the gain medium itself and the gain medium, 20. Amplification of an input pulse begins first with a pump beam 12, produced by a pump source, 11, being directed onto the gain medium, 20, by passage through the cavity end mirror, 13, which is designed to be transmissive at the pump wavelength. The wavelength of the pump beam is chosen to overlap, at least in part, an absorption band or bands of the gain medium, so as to raise it to an excited state. Pulses from the oscillator are stretched out in pulse duration by stretcher 5, and are caused to be incident on the resonant cavity of the regenerative amplifier. In this particular example these pulses, 6, possess a polarization arranged so that a portion is reflected off polarization beam splitter element 16, pass through polarization rotator element, 17, and are reflected off cavity end mirror, 14. Upon return passage through polarization rotator element, 17, these pulses have undergone a rotation of their plane of polarization by 90° and are once again incidence on polarization element, 16. As a result of this polarization rotation, they are no longer reflected but rather transmitted through polarization element, 16. They are then incident on, and pass through, the spectral filter 18, polarizer 19, the gain medium, 20 wherein they are amplified. They then strike mirror 13 and are reflected back along the same path toward mirror 14. Thus, all pulses incident on polarization beam splitter element 16, undergo passage through the gain medium at least twice before they are once again incident on polarization beam splitter element 16, coming from the direction of mirror 14. If nothing is done to prevent the rotation of the polarization of the beam by an additional 90° upon passage through polarization rotator 17 a third and fourth time, these pulses will be ejected along the path of the incoming beam, 6 with only slight amplification. If, however, the polarization rotator 17, is caused to change state so that one intracavity pulse from the oscillator pulse train is trapped with the amplifier cavity because its polarization is not rotated upon third and forth passage through element 17, then this pulse becomes a "seed" or "injected" pulse and will undergo multiple passages through the gain medium 20, the spectral filter 18, and all the other components within the cavity. Some time later, after the seed pulse has undergone repetitive traversal of the cavity and suitable amplification and spectral shaping therein, it is caused to be ejected from the cavity by a change in state of polarization rotator element, 17, and subsequent reflection off polarization beam splitter 16. Those skilled in the art of regenerative amplification will recognize that polarization rotator element 17, could be, for example, a pocket cell. They would also recognize that there are regenerative amplifier geometries that use an acousto-optic deflector to couple a seed pulse into and out of the amplifier resonator cavity. They will also recognize that there are regenerative amplifier geometries in which the Brewster angle face of the gain medium serves as an input port in a manner similar to that polarization beam splitter element 16, that there are geometries that use two Pockel Cells within the cavity which in part provide separate input and output ports, and so forth. These details are not germane to the essential nature of this invention which is intended to include these and other such variants on the concept of amplifying a seed pulse to high energies.

When it is desirable to suppress self-oscillation of the resonant cavity of the regenerative amplifier, yet allow amplification of the seed pulse so as to produce pulses that are both transform-limited and possess high energy, the parameters of the spectral filter element 18, would be chosen so that it has maximum transmission at the central peak wavelength of the seed pulse, and a bandwidth such that it would not limit the band width of seed pulse on amplification. This could be accomplished by the judicious choice of the effective free spectral range and finesse of the spectral filter element. For example, if it was desirable to run a Ti:Sapphire regenerative amplifier at a central wavelength of say 850 nm in a manner that suppressed parasitic oscillation in the amplifier resonant cavity, it would be possible to do this by choosing the spectra filter element to have a free spectral range larger than the reflectivity bandwidth of the mirrors use in the cavity and centered at 850 nm while at the same time possessing a finesse sufficient to produce a bandpass comparable to that of the seed pulse. More specifically, if the mirrors used in the regenerative amplifier cavity had a reflectivity bandwidth of, for example, 150 nm centered at 800 nm, and the desired pulse width out of the regenerative amplifier dictated a bandwidth of 10 nm, then incorporating a birefringent filter consisting of a single plate of thickness equal to 250 microns within the resonant cavity of the regenerative amplifier would serve, when acting in combination with other polarization elements within the cavity, as a tunable spectral filter with a free spectral range of about 200 nm, a finesse of 2 (or a FWHM bandpass of 100 nm). Properly oriented so that the effective bandpass was centered at 850 nm would result in an output from the regenerative amplifier that would possess a bandwidth of about 7 nm to 10 nm (100–150 fs) free of self-oscillatory emission at the approximate gain peak at 800 nm.

When the objective is to amplify pulses of extremely short pulse duration, the aforementioned use of a spectral filter, such as the 250 micron thick, single plate birefringent filter described above, in the cavity of a regenerative amplifier can broaden the bandwidth of the output pulse and thereby result in shorter amplified output pulsewidths. Under these conditions the birefringent filter is tuned so that a transmission minima coincides in wavelength with the effective gain maxima of the system. In the specific case wherein a 250 micron thick birefringent filter is tuned properly we have observed that we were able to affect a 25% reduction in output pulsewidth over that which could be achieved in the same system when the birefringent filter was removed.

As an additional example of the utility of using a spectral filter within the resonant cavity of a regenerative amplifier, consider the case of a system seeded with pulses from an oscillator that are of approximately 100 fs duration centered at 800 nm. These pulses possess a FWHM bandwidth of about 8 nm, but their total oscillating bandwidth may be as much as 40 nm. In a typical regenerative amplifier system these pulses might be stretched to 200 ps in a pulse stretcher and subsequently amplified by factors of as much as $10^7$. They are then recompressed back to a pulse width of about 110 fs in a pulse compressor. The time-bandwidth product of these pulses would be near transform-limited and the spectral bandwidth would be slightly less than 8 nm FWHM. But in some applications it is desirable to reduce this bandwidth from 8 nm to 0.8 nm, or even further, to 0.08, 0.008, and/or values in between (clearly at the expense of pulse width, but hopefully not sacrificing temporal resolution beyond that which can be obtained if this bandwidth-narrowed output pulse is transform-limited). It is also sometimes desirable to be able to adjust the center frequency of oscillation of this amplifier output pulse so that it can be adjusted to a resolution within the output bandwidth of the pulse itself (however, again there are exceptions. For example, when the regenerative amplifier output is being used to pump a parametric process like an optical parametric amplifier (OPA), the user can forego tunability in the amplifier because it is available in the OPA). More specifically, let us suppose that we wish the output of our regenerative amplifier system to have a nearly transform-limited pulse width in the range of 2 ps FWHM (that is, a bandwidth of about 0.5 nm). A single-plate birefringent filter of the type used in the above illustration would not be adequate to this task. Because while it may be possible to choose a plate thickness that is large enough to spectrally filter the seed pulse, the free spectral range would also be reduced, leading to the possibility of outputting pulses from the regenerative amplifier at multiple wavelengths. Instead, it would be necessary to use a birefringent filter of many plates with different free spectral ranges. One choice that would work in this example is a three plate birefringent filter with plate thicknesses of 0.5 mm, 3 mm, and 6 mm. This combination would produce an effective free spectral range of approximately 100 nm with a FWHM bandwidth of about 4 nm. Used within the resonant cavity of a regenerative amplifier seeded with pulses of approximately 100 fs duration would produce output pulses of between 1.6 and 2.5 ps and possessing a bandwidth of between 0.6 and 0.4 nm. The incorporation of additional bandwidth limiting elements, like a Fabry-Perot etalon, as additional bandwidth limiting elements within the cavity, would serve to narrow up the linewidth of the output pulse still further, producing still longer pulses of near transform-limited, time-bandwidth performance.

A further additional feature that may also be considered desirable is to make this spectral filter element 18, tunable so that fine adjustment of the central wavelength of oscillation of the output pulse is obtainable within the oscillating bandwidth of the injected seed pulse. In the above illustration this would be possible by rotation of the plates to tune the output within substantially all of the oscillating bandwidth of the seed laser, in this case by as much as 40 nm, with extremely high resolution and control. Thus the inclusion of a multi-plate birefringent filter within the resonant cavity of the regenerative amplifier seeded with pulses of femtosecond duration allows this system to produce pulses of longer duration that are tunable over a broad range, and at the same time serve to limit the self-oscillation of the amplifier cavity itself.

Judicious choice of the transmission bandwidth of the spectral filter of our invention incorporated into the regenerative amplifier cavity causes the spectral filter to act as a passive element that protects the system from catastrophic damage caused by self-focusing. This effect is achieved by operating at least one spectral filter within the cavity in a transmission maxima mode with a bandpass chosen to limit self-focusing by blocking amplification of excess bandwidth created by nonlinear effects like self-phase modulation and continuum generation.

From the foregoing description it will be apparent that there has been provided an improved regenerative laser amplifier system which possesses the desirable characteristics of being able to provide pulses of variable pulse width duration. Judicious choice of the system design parameters allow the production of output pulses with near transform-limited time-bandwidth product free of background self-oscillation emission -from the resonant cavity of the regenerative amplifier itself, or pulses of extremely short pulse duration and in some circumstances operation free damage due to self-focusing.

Further selection of the design parameters of the system would provide the additional desirable characteristic of providing single-element, spectrally tunable output pulses whose center wavelength could be controlled to a high degree of resolution within the entire spectral emission band of the seed oscillator. Variations and modifications in the systems described herein that are within the scope of the invention will undoubtedly suggest themselves to those skilled in the art. Accordingly, the foregoing description should be taken as illustrative and not in a limiting sense.

We claim:

1. An amplifier for amplifying seed pulses, the seed pulses having energy in a band of wavelengths and characterized by a center wavelength comprising:

a resonant cavity:

a gain medium in said resonant cavity characterized by a gain bandwidth that at least partially overlaps the band of wavelengths of the seed pulses; and a spectral filter within the resonant cavity for passing a band of wavelengths that at least partially overlaps the gain bandwidth and the band of wavelengths of the seed pulse and selected to introduce losses as a function of wavelength into the cavity that filter out excess bandwidth and thereby prevent damage due to self-focusing.

2. The amplifier of claim 1 in which the spectral filter is selected to limit the bandwidth to a level that prevents damage to the components of the system.

3. The amplifier of claim 1 in which the filter comprises one or more elements selected from the group consisting of:

a birefringent filter with one or more plates;

an etalon;

a prism acting in combination with a slit, a soft edge aperture, a liquid crystal spatial light modulator, or an acousto-optic modulator;

an electro-optic tuner;

a bandpass interference filter; and a grating acting in combination with a slit, a soft edge aperture, a liquid crystal spatial light modulator, or an acousto-optic modulator.

4. The amplifier of claim 1 in which the gain medium is selected from the group consisting of Ti:Sapphire, Fosterire, Nd:YAG, Nd:YLF, Nd:Glass LiSAF, Li:CAF, Alexandrite, Cr:YAG, and Erbium-doped fiber.

5. The amplifier of claim 2 in which the filter bandpass is comparable to or less than the bandwidth of the amplifier output and the filter is operated in the transmission maxima regime.

6. The amplifier of claim 2 in which the filter comprises one or more elements selected from the group consisting:

a birefringent filter with one or more plates;

an etalon;

a prism acting in combination with a slit, a soft edge aperture, a liquid crystal spatial light modulator, or an acousto-optic modulator;

an electro-optic tuner;

a bandpass interference filter; and a grating acting in combination with a slit, a soft edge aperture, a liquid crystal spatial light modulator, or an acousto-optic modulator.

7. The amplifier of claim 2 in which the gain medium is selected from the group consisting of Ti:Sapphire, Fosterite, Nd:YAG, Nd:YLF, Nd:Glass LiSAF, Li:CAF, Alexandrite, Cr:YAG, and Erbium-doped fiber.

8. The amplifier of claim 5 in which the filter comprises one or more elements selected from the group consisting of:

a birefringent filter with one or more plates;

an etalon;

a prism acting in combination with a slit, a soft edge aperture, a liquid crystal spatial light modulator, or an acousto-optic modulator;

an electro-optic tuner;

a bandpass interference filter; and a grating acting in combination with a slit, a soft edge aperture, a liquid crystal spatial light modulator, or an acousto-optic modulator.

9. The amplifier of claim 5 in which the gain medium is selected from the group consisting of Ti:Sapphire, Fosterite, Nd:YAG, Nd:YLF, Nd:Glass LiSAF, Li:CAF, Alexandrite, Cr:YAG, and Erbium-doped fiber.

10. An amplifier for amplifying seed pulses, the seed pulses having energy in a band of wavelengths and characterized by a center wavelength comprising:

a resonant cavity;

a gain medium in said resonant cavity characterized by a gain bandwidth that at least partially overlaps the band of wavelengths of the seed pulse, and a spectral filter within the resonant cavity for altering a band of wavelengths that at least partially overlaps the gain bandwidth and the band of wavelengths of the seed pulse, said spectral filter selected to suppress gain narrowing effects, and having a transmission minima approximately coinciding in wavelength with the peak of the effective gain profile in the system.

11. The amplifier of claim 10 in which the spectral filter comprises one or more elements selected from the group consisting of:
- a birefringent filter with one or more plates;
- an etalon;
- a prism acting in combination with a slit, a soft edge aperture, a liquid crystal spatial light modulator, or an acousto-optic modulator;
- an electro-optic tuner;
- a bandpass interference filter; and
- a grating acting in combination with a slit, a soft edge aperture, a liquid crystal spatial light modulator, or an acousto-optic modulator.

12. The amplifier of claim 10 in which the gain medium is selected from the group consisting of Ti:Sapphire, Fosterite, Nd:YAG, Nd:YLF, Nd:Glass LiSAF, Li:CAF, Alexandrite, Cr:YAG, and Erbium-doped fiber.

13. The amplifier of claim 11 in which the gain medium is selected from the group consisting of Ti:Sapphire, Fosterite, Nd:YAG, Nd:YLF, Nd:Glass LiSAF, Li:CAF, Alexandrite, Cr:YAG, and Erbium-doped fiber.

14. The amplifier of claim 11 in which the birefringent filter comprises a single plate approximately 250 microns thick.

15. A method of operating an amplifier having a gain medium within the cavity comprising the steps of:
- injecting seed pulses into the cavity; and
- amplifying the seed pulses in multiple passes through the gain medium while suppressing self-focusing by incorporating a spectral filter within the resonant cavity that is resonant with the seed pulse and has a bandpass that filters out unwanted excess bandwidth.

16. The method of claim 15 in which the spectral filter has a bandwidth comparable to or less than the bandwidth of the amplifier output.

17. The method of claim 15 in which the spectral filter blocks amplification of excess bandwidth created by non-linear effects.

18. The method of claim 17 in which the non-linear effects include self phase modulation and continuum generation.

19. A method of operating an amplifier having a gain medium within a cavity comprising the steps of:
- injecting seed pulses into the cavity; and
- amplifying the seed pulse in multiple passes through the gain medium while suppressing gain narrowing by incorporating a spectral filter within the resonant cavity having a transmission mimina approximately coinciding in wavelength with the effective gain of the system.

* * * * *